(12) United States Patent
Stebnicki et al.

(10) Patent No.: US 7,137,505 B2
(45) Date of Patent: Nov. 21, 2006

(54) SPLIT ROLLER AND MODULAR CONVEYING ASSEMBLIES FORMED THEREFROM

(75) Inventors: James C. Stebnicki, Glendale, WI (US); Dean A. Wieting, Milwaukee, WI (US); Kevin S. Hansen, Grafton, WI (US)

(73) Assignee: Rexnord Industries, Inc., Milwaukee, WI (US)

( * ) Notice: Subject to any disclaimer, the term of this patent is extended or adjusted under 35 U.S.C. 154(b) by 138 days.

(21) Appl. No.: 10/891,617

(22) Filed: Jul. 15, 2004

(65) Prior Publication Data

US 2006/0011454 A1 Jan. 19, 2006

(51) Int. Cl.
*B65G 17/24* (2006.01)
(52) U.S. Cl. .................. 198/850; 198/779; 198/842
(58) Field of Classification Search ............... 198/779, 198/842, 850, 851, 852, 853
See application file for complete search history.

(56) References Cited

U.S. PATENT DOCUMENTS

| | | | |
|---|---|---|---|
| 665,806 A * | 1/1901 | Smith ............................. 38/63 |
| 1,377,450 A | 5/1921 | Whipple |
| 1,641,642 A | 9/1927 | Pangborn |
| 1,743,724 A * | 1/1930 | Murdock et al. ............... 48/78 |
| 1,748,456 A * | 2/1930 | Pangborn .................... 198/779 |
| 1,883,005 A * | 10/1932 | Shafer, Jr. .................... 198/779 |
| 2,554,038 A * | 5/1951 | Lemmon ..................... 198/779 |
| 3,082,861 A | 3/1963 | Kornylak |
| 3,550,756 A | 12/1970 | Kornylak |
| 3,657,779 A * | 4/1972 | Granberry ................... 198/842 |
| 3,964,588 A | 6/1976 | Kornylak |
| 4,231,469 A | 11/1980 | Arscott |
| 4,402,390 A | 9/1983 | Feeney |
| D289,734 S | 5/1987 | Schroeder et al. |
| D299,424 S | 1/1989 | Schroeder et al. |
| D299,425 S | 1/1989 | Schroeder et al. |
| 4,821,869 A | 4/1989 | Hodlewsky |
| 4,880,107 A | 11/1989 | Deal |
| 4,909,380 A | 3/1990 | Hodlewsky |
| 4,925,016 A | 5/1990 | LaPeyre |
| 4,993,540 A | 2/1991 | van Capelleveen |
| 5,096,050 A | 3/1992 | Hodlewsky |
| 5,117,970 A * | 6/1992 | Gibbs ......................... 198/842 |
| 5,224,583 A | 7/1993 | Palmaer et al. |
| 5,238,099 A | 8/1993 | Schroeder et al. |
| 5,261,525 A | 11/1993 | Garbagnati |
| 5,330,045 A | 7/1994 | Hodlewsky |
| 5,404,997 A | 4/1995 | Schreier et al. |
| 5,706,934 A | 1/1998 | Palmaer et al. |
| 6,044,956 A | 4/2000 | Henson et al. |
| 6,148,990 A | 11/2000 | Lapeyre et al. |
| 6,209,714 B1 | 4/2001 | Lapeyre et al. |
| 6,315,109 B1 * | 11/2001 | Dean ........................... 198/786 |
| 6,367,616 B1 * | 4/2002 | Lapeyre et al. ............. 198/779 |
| 6,398,015 B1 | 6/2002 | Sedlacek et al. |
| 6,494,312 B1 | 12/2002 | Costanzo |

(Continued)

OTHER PUBLICATIONS

PCT International Search Report dated Sep. 30, 2005.

*Primary Examiner*—Douglas Hess
(74) *Attorney, Agent, or Firm*—Quarles & Brady LLP

(57) ABSTRACT

A split roller including at least two parts joined together forms the roller having a length defined between roller ends. At least two of the at least two parts are joined along a joint extending between the roller ends. A roller cradle assembly and a modular conveying assembly can be assembled including the roller.

12 Claims, 3 Drawing Sheets

U.S. PATENT DOCUMENTS

2001/0045346 A1    11/2001   Costanzo

2002/0020609 A1    2/2002   Lepeyre et al.

\* cited by examiner

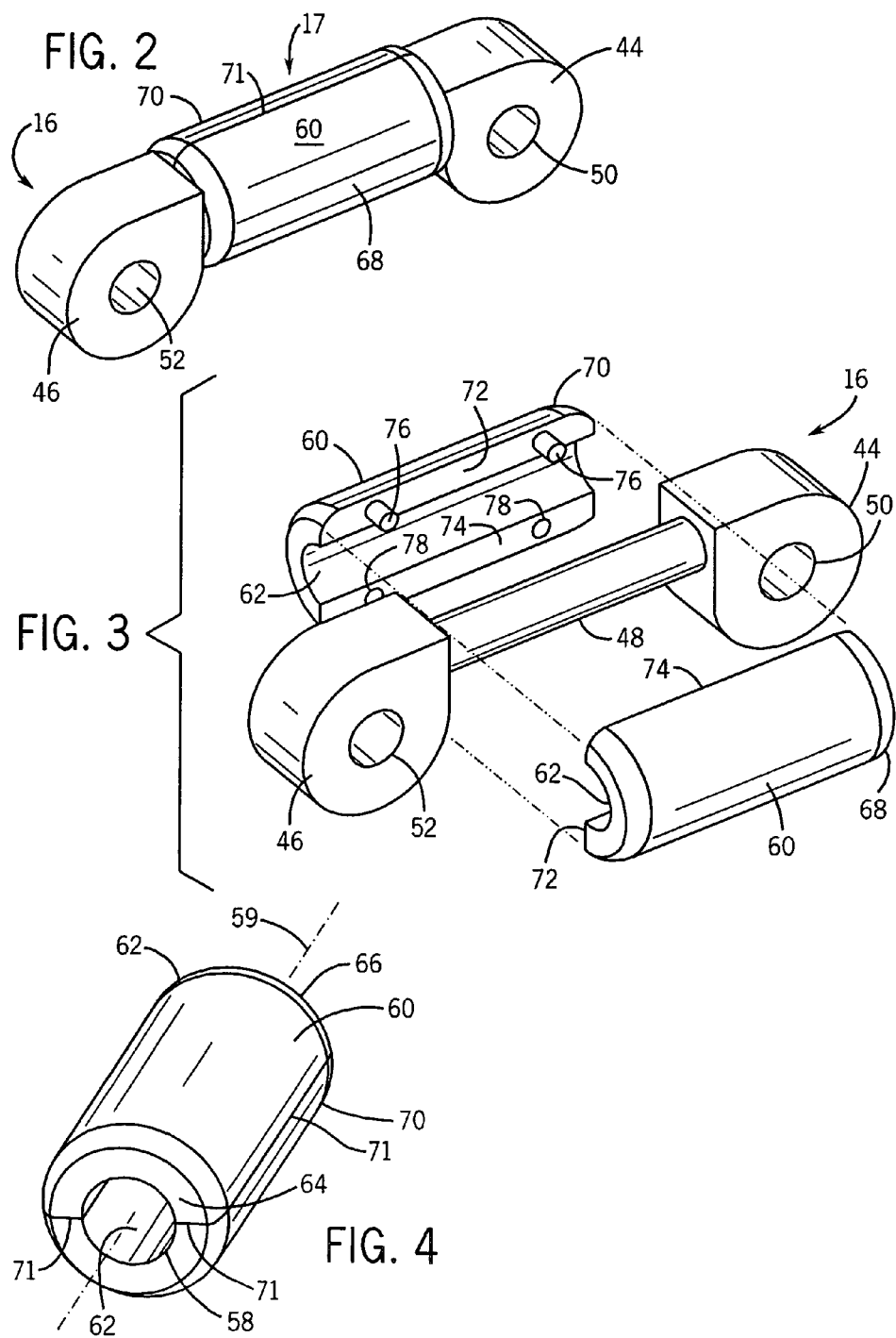

SPLIT ROLLER AND MODULAR CONVEYING ASSEMBLIES FORMED THEREFROM

CROSS REFERENCES TO RELATED APPLICATIONS

Not Applicable.

STATEMENT REGARDING FEDERALLY SPONSORED RESEARCH

Not Applicable.

BACKGROUND OF THE INVENTION

The present invention relates to modular conveyor belts and chains, and more particularly to a roller cradle and a modular conveying assembly including at least one roller cradle.

Modular belting and chains are formed from interconnected modules that are supported by a frame and driven to transport a product. Each module has a support surface which supports the product as the belting or chain is being driven along the frame. Adjacent modules are connected to each other by hinge pins inserted through hinge members extending from adjacent modules in the direction of the belt travel.

Modular belts can transport products in the direction of conveyor travel, but have difficulty transferring a product, especially a high friction product, onto or off of the belt. In addition, high friction products can easily damage the belt if the product is transferred onto, or off of, the chain from a direction other than the chain direction of travel. A known conveyor belt disclosed in U.S. Pat. No. 4,231,469 issued to Arscott solves this problem by supporting the high friction products on rollers. The rollers are supported by roller cradles, and extend above the cradle for rolling contact with an object being conveyed. The rollers reduce friction between the belt and the object. Unfortunately, assembling the roller in the cradle is difficult requiring insertion of the roller into the cradle, and then slipping an axle or two stub axles through holes formed through the cradle walls and into the roller. The axle must then be secured to prevent it from slipping out of one of the holes formed in the cradle wall.

Another problem arises with modular belts having product supporting rollers. If the roller becomes damaged, the belt must be disassembled to replace the damaged roller. This is very time consuming and expensive. In a modular belt having cradles, such as disclosed in Arscot, the entire cradle is often replaced to save time at the expense of the additional material cost.

SUMMARY OF THE INVENTION

The present invention provides a modular conveyor belt having rollers for minimizing damage to the belt when transferring high friction products. Each roller is supported by a supporting shaft forming part of a roller cradle that is interposed between adjacent belt modules. In one embodiment, the roller is wrapped around the supporting shaft and extends axially between opposing roller ends. The roller is formed from at least two parts joined along a joint extending between the two ends.

A general objective of the present invention is to provide a modular conveying assembly that can transfer high friction objects without severely damaging the objects or the assembly. This objective is accomplished by providing a roller cradle in the assembly that supports a roller that reduces friction between the object and the conveying assembly.

Another objective of the present invention is to provide a roller that is easily assembled onto a supporting shaft of the cradle. This objective is accomplished by providing a roller formed from at least two parts joined along a joint extending between the two ends, such that the roller parts can be wrapped around the supporting shaft extending between hinge members.

This and still other objectives and advantages of the present invention will be apparent from the description which follows. In the detailed description below, preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

BRIEF DESCRIPTION OF THE DRAWINGS

FIG. 2 is an assembled perspective view of the roller cradle assembly of FIG. 1;

FIG. 3 is an exploded perspective view of the roller cradle assembly of FIG. 1;

FIG. 4 is a perspective view of the roller of FIG. 1;

DETAILED DESCRIPTION OF PREFERRED EMBODIMENTS

Figure 1:
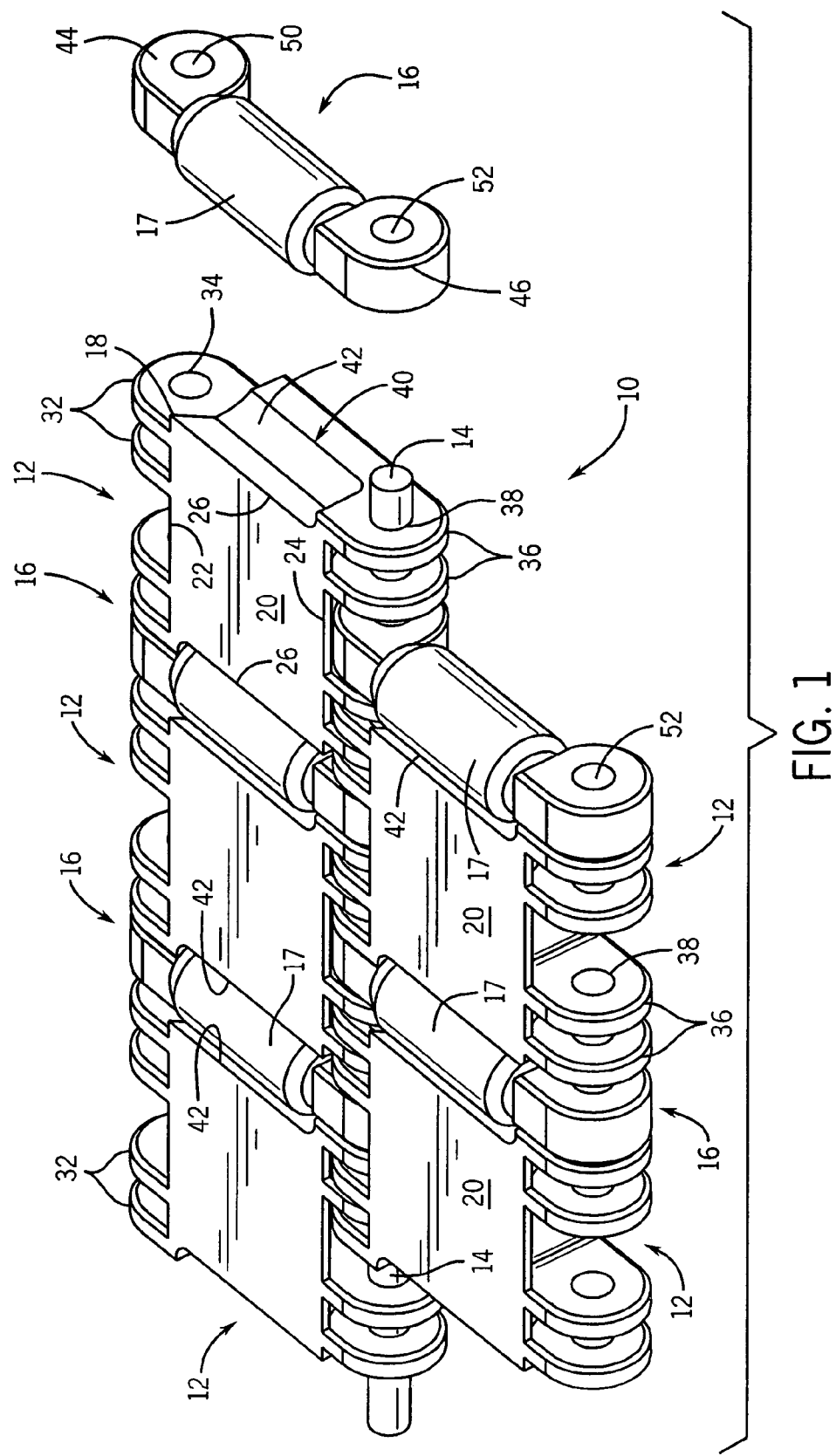
FIG. 1 is a partially exploded perspective view of a modular conveyor belt incorporating the present invention.

A modular conveying assembly, or belt 10, shown in FIG. 1, includes a plurality of chain modules 12 assembled in an edge to edge relation to form the continuous belt 10. Hinge pins 14 join adjacent modules 12, and pivotally connect the adjacent modules 12 in the direction of belt travel. Cradles 16 retained by the hinge pins 14 between modules 12 support transverse rollers 17 that rotatably engage an object being conveyed by the belt 10 to reduce friction between the belt 10 and the object. Advantageously, if the module 12, cradle 16, or roller 17 is damaged, only the damaged component needs to be replaced.

The modules 12 are preferably formed using methods known in the art, such as injection molding, from materials known in the art, such as acetal, polyethylene, polypropylene, nylon, and the like. Each module 12 includes a body 18 having a top surface 20 surrounded by a leading edge 22 and trailing edge 24 joined by side edges 26. Advantageously, the top surface 20 can prevent objects from falling through the module belt 10. Of course, the top surface 20 can also have perforations to allow air or other fluid flow for cooling, drafting, or draining.

The module body 18 has a width which is defined by the distance between the side edges 26, and a length which is defined by the distance between the longitudinal leading and trailing edges 22, 24. Leading edge hinge members 32 extending forwardly from the leading edge 22 of the module body 18 include coaxial openings 34. The opening 34 formed in each leading edge hinge member 32 is coaxial with the opening 34 in the adjacent leading edge hinge member 32 for receiving the hinge pin 14. Trailing edge hinge members 36 extending rearwardly from the trailing edge 24 also include coaxial openings 38. As in the leading edge hinge member openings 34, the opening 38 formed in each trailing edge hinge member 36 is coaxial with the opening in the adjacent trailing edge hinge member 36 of a module 12.

The forwardly extending leading edge hinge members 32 of one module 12 intermesh with trailing edge hinge members 36 extending rearwardly from an adjacent module 12. When the intermeshing hinge members 32, 36 are aligned, the openings 34, 38 in the aligned hinge members 32, 36 are aligned to receive the hinge pin 14 which pivotally joins the modules 12 together. Although hinge members 32, 36 extending rearwardly and forwardly from the leading and trailing edges 22, 24, respectively, are shown, the hinge members 32, 36 can also extend in other directions, such as downwardly, proximal the respective edges 22, 24 without departing from the scope of the present invention.

Each side edge 26 of the module body 18 includes a concave portion 40 defined by a concave surface 42 that opens toward, and faces, a concave surface 42 formed in the side edge 26 of the adjacent module body 18. The concave surfaces 42 wrap around a portion of the roller 17 supported between the adjacent modules 12. In one embodiment, the roller 17 disposed between the modules 12 extends into the concave portions 40 of each module body 18 which allows the top surfaces 20 of the adjacent module bodies 18 to extend over a portion of the roller 17, and minimize the gap between adjacent modules 12 and between the adjacent body top surfaces 20 and the roller 17. However, in the preferred embodiment shown in FIG. 1, the top surfaces 20 do not extend over a portion of the roller 17 to simplify manufacturing of the module 12.

As shown in FIGS. 1–3, the cradles 16 are retained by the hinge pins 14 between adjacent modules 12, and are not attached directly to the modules 12. The position and number of cradles 16 in the belt 10 is customizable, and depends upon the conveyor belt application. Preferably, the cradles 16 are formed using methods known in the art, such as injection molding, from materials known in the art, such as acetal, polyethylene, polypropylene, nylon, and the like. However, the cradles can be formed from other materials, such as metal, without departing from the scope of the invention.

Each cradle 16 includes a supporting shaft 48 extending between a leading edge hinge member 44 and a trailing edge hinge member 46. The supporting shaft 48 rotatably supports the roller 17 disposed between the adjacent module side edges 26. Each cradle hinge member 44, 46 includes an opening 50, 52 which is aligned with the openings 34, 38 in adjacent module hinge members 32, 36. The openings 34, 38, 50, 52 are aligned for receiving the hinge pin 14 which pivotally joins adjacent rows of modules 12 and cradles 16 together and fixes the cradles 16 relative to the modules 12 in a row. Although the cradle and module hinge members are designated as leading edge and trailing edge for convenience, the cradle and module disclosed herein can be used in any orientation without departing from the scope of the invention. Moreover, although the cradle 16 disclosed herein is formed as a single piece, such as by molding, the cradle 16 can be formed from two or more pieces that are joined together without departing from the scope of the invention.

One roller 17 is rotatably supported by the supporting shaft 48 of the cradle to form a roller cradle assembly. At least a portion of the roller 17 extends above the cradle 16 to engage the object being conveyed by the belt 10. Of course, the roller 17 can also, or alternatively, extend below the cradle 16 without departing from the scope of the invention. Preferably, the roller 17 is molded from a plastic, and includes a throughhole 58 formed therethrough for receiving the shaft 48. Advantageously, the roller 17 rotates about the shaft 48 to minimize friction between the belt 10 and object being conveyed. Although a plastic roller is disclosed, the roller can be formed from any material, such as elastomers, metals, and the like, suitable for the particular application without departing from the scope of the invention.

Each roller 17 is cylindrical having an outer surface 60 radially spaced from an inner surface 62. The inner surface 62 defines the axially extending through hole 58 which is coaxial with a roller axis 59, and engages the supporting shaft 48 extending through the roller through hole 58. The outer surface 60 engages the object being conveyed, and extends between roller ends 64, 66.

In the embodiment shown in FIGS. 2–4, the roller 17 is longitudinally split to form two halves 68, 70 extending the length of the roller 17. The halves 68, 70 are joined along longitudinally extending joints 71 extending the length of the roller between the two halves 68, 70. Although the joint 71 disclosed in FIGS. 2–4 extends the entire length of the roller 17 between the roller ends 64, 66 and parallel to the roller axis 59, the longitudinally extending joints 71 can have segments, such as shown in the alternate embodiment disclosed in FIG. 6, that extend in a direction not parallel to the roller axis 59 to axially lock the halves 68, 70 relative to each other without departing from the scope of the invention.

Preferably, each half 68, 70 is a half cylinder defining a portion of the through hole 58. Advantageously, each half 68, 70 has a clear path for radially receiving the shaft 48 in the portion of the through hole 58 defined by the half 68, 70. Once the shaft 48 is received in the portion of the through hole 58 defined by one of the halves 68, the path into the portion of the through hole 58 defined by that half 68 is closed by joining the other half 70 to the first half 68.

Although a split roller 17 formed from two parts defining roller halves 68, 70 is disclosed, the split roller 17 can be formed from two or more parts without departing from the scope of the invention. For example, in one alternate embodiment, one of the parts can be formed from two or more sections which when joined together extends the length of the roller. In another alternate embodiment, the roller can be formed from three or more parts, wherein none of the parts define a roller half and/or one or more of the parts do not extend the entire length of the roller. Preferably, however, one of the parts extends the entire length of the roller 17 between the roller ends 64, 66. The part extending the length of the roller provides a base to which the other parts of the roller 17 can be joined.

Each roller half 68, 70 includes a pair of joining faces 72, 74. The joining faces 72, 74 on one half 68 abuts the joining faces 72, 74 of the other half 70 when the halves 68, 70 are joined together to form the roller 17. Posts 76 extending from one face 72 of each half 68, 70 are received in holes 78 formed in the opposing face 74 of the other half 68, 70 to mechanically join the halves together using a snap fit. Advantageously, the posts align the halves 68, 70, such that the roller 17 has a generally continuous outer surface 60. An adhesive can be applied to the faces 72, 74 to chemically bond the faces 72, 74 together. Of course, other methods for joining the parts in addition to, or instead, of mechanical fasters and/or chemical bonding can be used, such as thermal bonding, without departing from the scope of the invention.

The roller 17 is assembled with the cradle 16 to form a roller cradle assembly by wrapping the roller halves 68, 70 around the supporting shaft 48 and joining the halves 68, 70 together. The roller 17 is wrapped around the supporting shaft 48 by radially inserting the shaft 48 into the portion of the through hole 58 defined by one of the halves 68, and then joining the other half 70 to the first half 68, such that the shaft 48 extends axially through the through hole 58 defined by the roller halves 68, 70. Of course, if the cradle 16 is formed from two or more components, the cradle 16 can be assembled before wrapping the roller 17 around the supporting shaft 48 or after axially slipping the supporting shaft 48 through the roller through hole 58 of an assembled roller 17 without departing from the scope of the invention.

The belt 10 is assembled by positioning at least one cradle 16 rotatably supporting a roller 17 between concave surfaces 42 of adjacent modules 12, and aligning the trailing and leading edge hinge members 32, 36, 44, 46 of the adjacent modules 12 and cradles 16. The trailing hinge members openings 38, 52 are aligned and the leading edge hinge member openings 34, 50 are aligned to form a row of modules 12 and cradles 16. The trailing edge hinge members 36, 46 of the row of modules 12 and cradles 16 are intermeshed with aligned leading edge hinge members 32, 44 of an adjacent row of modules 12 and cradles 16, such that the openings 34, 38, 50, 52 in the intermeshed hinge members 32, 36, 44, 46 are aligned. The hinge pin 14 is then slipped through the aligned hinge member openings 34, 38, 50, 52 to pivotally link the modules 12 and cradles 16 forming one row of the belt to the modules 12 and cradles 16 forming another row to form the belt 10.

Figure 5:
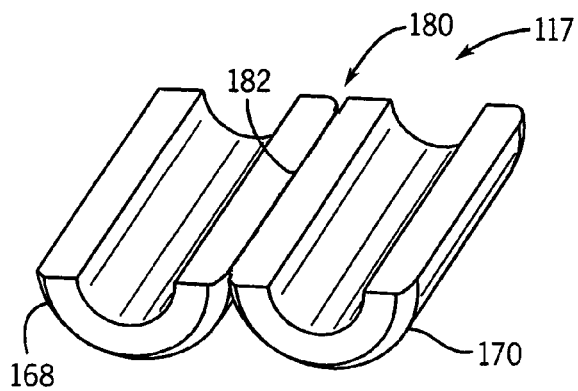
FIG. 5 is a perspective view of an alternative roller incorporating the present invention.

In another embodiment disclosed in FIG. 5, a roller 117 is formed from two halves 168, 170 joined along a longitudinal edge 180 by a hinge 182 which maintains the halves 168, 170 in proper alignment as they are joined together. Preferably, the hinge 182 is a living hinge formed by molding the roller halves 168, 170 with the hinge 182 as an integral part thereof. The roller halves 168, 170 are wrapped around the supporting shaft 48 by hingedly pivoting one roller half 168 relative to the other roller half 170 around the supporting shaft 48. Once the roller 117 is wrapped around the supporting shaft 48, the roller halves 168, 170 are joined to each other to form the assembled roller 117 using methods, such as those disclosed above.

Figure 6:
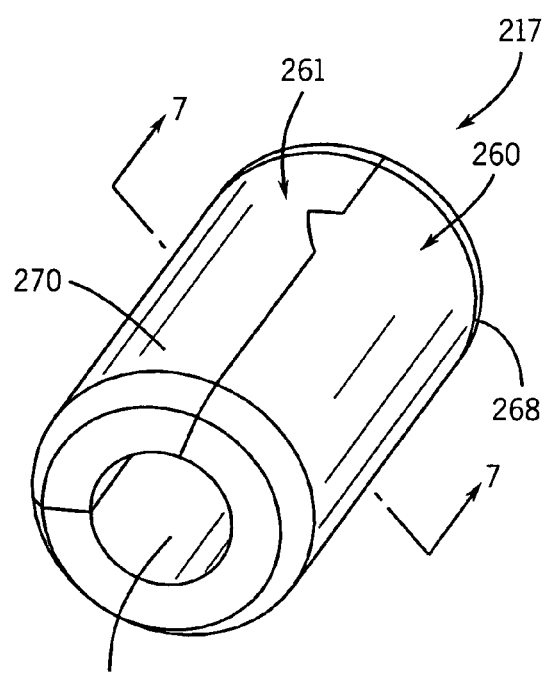
FIG. 6 is a perspective view of yet another alternative roller incorporating the present invention.
Figure 7:
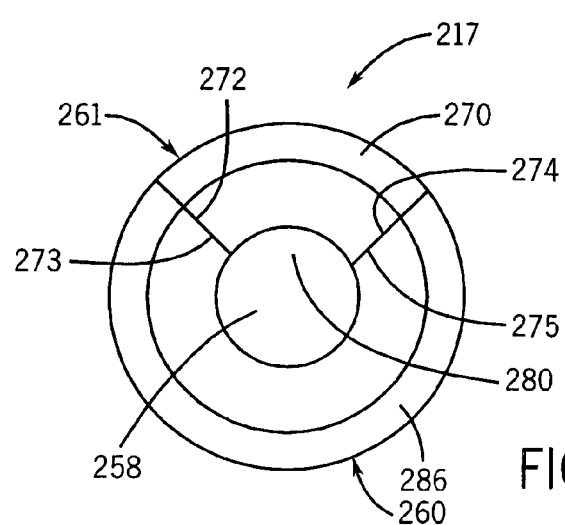
FIG. 7 is a cross sectional view along line 7—7 of FIG. 6.

In yet another embodiment shown in FIGS. 6 and 7, a roller 217 is formed from a roller body 268 having a longitudinal slot 280, or opening, extending the length of the roller body 268. The slot 280 provides a passageway for radially passing a supporting shaft 48 aligned with the roller axis therethrough into a portion of a through hole 258 defined by the body 268. A wedge 270 is received in the slot 280 to form the roller 217 and close the slot 280. Preferably, the roller body 268 has nonparallel faces 272, 274 forming the slot 280 that conform with opposing faces 273, 275 of the wedge 270 to properly align the outer surfaces 260, 261 of the body 268 and wedge 270, respectively. Advantageously, the slot 280 allows the body 268 to wrap around the supporting shaft 48, such that the supporting shaft 48 is received in the portion of the roller through hole 258, without disassembling the cradle 16 or modular belt 10. Once the supporting shaft 48 is received in the roller through hole 258, the wedge 270 is secured in the slot 280 to form the assembled roller using methods, such as those disclosed above. Preferably, the wedge also defines a portion of the through hole 258 to form a through hole having a circular cross section.

While there has been shown and described what are at present considered the preferred embodiments of the invention, it will be obvious to those skilled in the art that various changes and modifications can be made therein without departing from the scope of the invention defined by the appended claims. For example, the shafts disclosed herein are cylindrical having a circular cross section, however, the shafts can have any cross section.

We claim:

1. A roller cradle assembly for use in a modular conveying assembly, said assembly comprising:
   a first hinge member having a hinge opening;
   a second hinge member having a hinge opening;
   a supporting shaft extending between said first hinge member and said second hinge member wherein said supporting shaft runs longitudinally perpendicular to said hinge openings, said first hinge member, second hinge member, and supporting shaft being formed as a single piece; and
   a roller wrapped around said supporting shaft and extending axially between opposing roller ends, said roller being formed from at least two parts joined along a joint extending between said two ends.

2. The roller cradle assembly as in claim 1, in which adjacent longitudinal edges of said at least two of said at least two parts are joined by a hinge.

3. The roller cradle assembly as in claim 2, in which said hinge is a living hinge.

4. The roller cradle assembly as in claim 1, in which said at least two parts are joined by a method selected from a group consisting of mechanical fasteners, thermal bonding, and chemical bonding.

5. The roller cradle assembly as in claim 1, in which said roller is formed from two parts, each of said parts forming a half of said roller.

6. The roller cradle assembly as in claim 1, in which at least one of said at least two parts is formed as a single piece extending the entire length of said roller.

7. A modular conveying assembly for conveying an object, said assembly comprising:
   a plurality of chain modules assembled in an edge to edge relation to form a continuous belt, at least one of said modules having side edges joined by leading and trailing edges;
   at least one hinge pin joining said at least one of said modules and said adjacent chain module;
   at least one cradle interposed between said at least one of said modules and said adjacent chain module, said cradle including a supporting shaft extending between first and second hinge members and formed as a single piece with said first and second hinge members; and
   a roller wrapped around said supporting shaft and extending axially between opposing roller ends, said roller being formed from at least two parts joined along a joint extending between said roller ends to form said roller.

8. The modular conveying assembly as in claim 7, in which adjacent longitudinal edges of at least two of said at least two parts are joined by a hinge.

9. The modular conveying assembly as in claim 8, in which said hinge is a living hinge.

10. The modular conveying assembly as in claim 7, in which said at least two parts are joined by a method selected from a group consisting of mechanical fasteners, thermal bonding, and chemical bonding.

11. The modular conveying assembly as in claim 7, in which said roller is formed from two parts, each of said parts forming a half of said roller.

12. The modular conveying assembly as in claim 7, in which at least one of said at least two parts is formed as a single piece extending the entire length of said roller.

* * * * *